G. H. PATULLO.
Scroll-Saw Tables.

No. 149,952. Patented April 21, 1874.

WITNESSES.

INVENTOR:

BY

ATTORNEYS.

UNITED STATES PATENT OFFICE.

GEORGE HALKETT PATULLO, OF DEXTER, MICHIGAN, ASSIGNOR TO HIM-
SELF AND DAVID A. BOGGS, OF SAME PLACE.

IMPROVEMENT IN SCROLL-SAW TABLES.

Specification forming part of Letters Patent No. 149,952, dated April 21, 1874; application filed
January 31, 1874.

*To all whom it may concern:*

Be it known that I, GEORGE H. PATULLO, of Dexter, in the county of Washtenaw and State of Michigan, have invented a new and useful Improvement in Scroll-Saw Table, of which the following is a specification:

This invention relates to the mode of adjusting the tables of scroll and similar saws for sawing scrolls or other forms, square or on a bevel; and consists in the construction and arrangement of parts, by means of which the table is rotated on its pedestal while standing level or at any desired angle with the saw.

Figure 1:
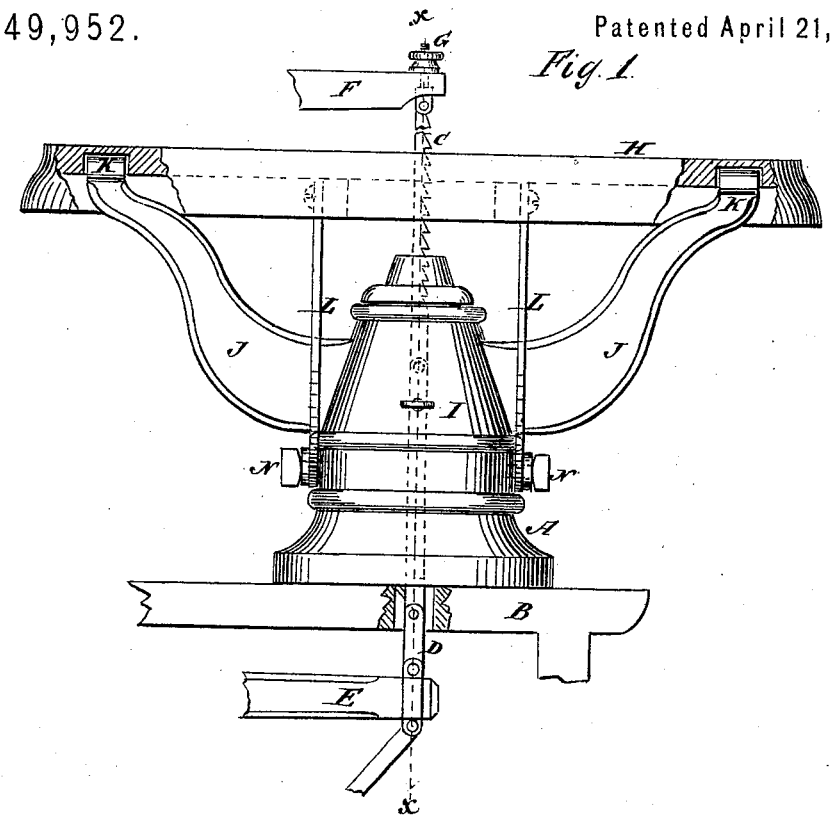
Figure 2:
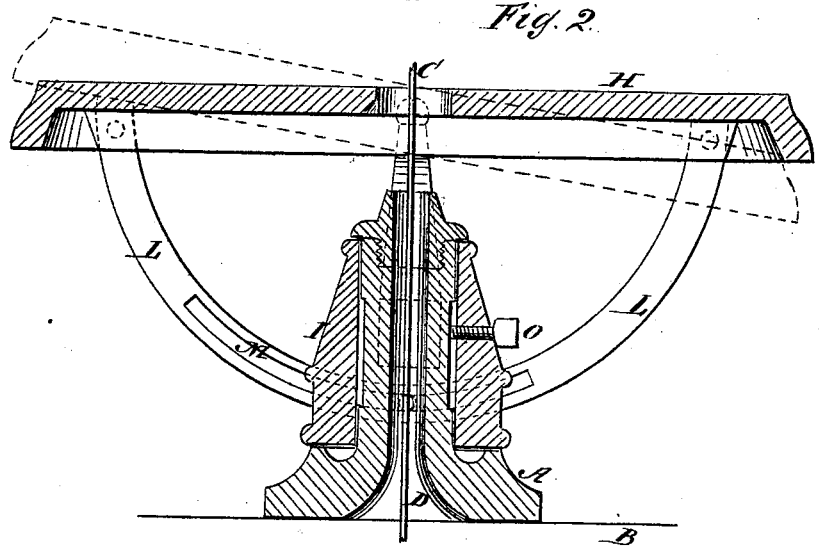

In the accompanying drawing, Figure 1 is a side elevation, partly in section, showing the table on a level or at right angles with the saw. Fig. 2 is a vertical section of Fig. 1, taken on the line $x\,x$.

Similar letters of reference indicate corresponding parts.

A is a tubular stand or pedestal, which rests upon the bench B, and is, of course, stationary. C is the saw. D is the rod or strap which connects the saw with the lower arm E of the saw-gate. F is the upper arm, with which the end of the saw is connected. G is a screw-nut, by means of which the saw is given the proper tension. The saw and connecting-rod D play through the stationary pedestal A. H is the table. I is a sleeve on the pedestal or stand A. J J are arms, which are rigidly attached to the sleeve, upon the ends K K of which the table rests. These ends are rounded, and enter rounded cavities in the under side of the table, and the table turns upon them as upon hinges. L L are semicircular bars, the ends of which are rigidly attached to the under side of the table. These semicircular bars extend on two opposite sides of the sleeve, below the arms J J, having each a slot, M, therein, by means of which they are fastened to the sleeve by set-screws N N when the table is to be made fast, after being properly adjusted. These slots allow the table to be fastened at a level, or at right angles with the saw, or at any other desired angle. Ordinarily an angle of forty-five degrees would be the limit; but the table may be made to exceed that, if desired. O is a set-screw through the sleeve, by which the rotating movement of the table is prevented when that is desired. It will be seen, therefore, that the table may be rotated around the saw, whether on a level or standing at an angle.

The advantages of this arrangement are many and obvious. Instead of turning the scroll or piece of wood upon the table, the table turns with the scroll. Where it is desired to saw straight pieces beveling, the table may be made fast at any desired angle, with temporary guides attached. The table is, therefore, adapted for all kinds of sawing. The different adjustments are made simple and substantial, with no part likely to break or get out of order.

Having thus described my invention, I claim as new and desire to secure by Letters Patent—

A scroll-saw table constructed and arranged to operate substantially as shown and described—that is, having pedestal A, sleeve I, arms J J, (with rounds K K, on which the table rests and turns,) slotted semicircles L L, and set-screws N N and O, arranged substantially as and for the purposes set forth.

GEORGE HALKETT PATULLO.

Witnesses:
 DAVID A. BOGG,
 C. B. GUMOR.